United States Patent
Hall, Jr. et al.

[15] 3,658,304
[45] Apr. 25, 1972

[54] MEANS FOR VAPOR COATING
[72] Inventors: Thomas H. Hall, Jr.; Jon R. Cottrill; Roger D. Dubble, all of Lancaster, Ohio
[73] Assignee: Anchor Hocking Corp., Lancaster, Ohio
[22] Filed: May 11, 1970
[21] Appl. No.: 36,350

[52] U.S. Cl. ...................... 261/23 R, 117/106 R, 261/124, 261/142, 261/151, 261/153
[51] Int. Cl. ........................................................ B01f 3/04
[58] Field of Search .............. 117/106 R; 261/153, 142, 124, 261/151, 23 R

[56] References Cited

UNITED STATES PATENTS

| | | | |
|---|---|---|---|
| 1,530,882 | 3/1925 | Chapin | 261/153 X |
| 2,155,932 | 4/1939 | Davis | 117/106 |
| 2,296,930 | 9/1942 | Ihler | 261/153 |
| 2,326,243 | 8/1943 | Meyer | 261/153 |
| 2,789,531 | 4/1957 | Diefendorf | 119/17 |
| 2,873,222 | 2/1959 | Derick et al. | 117/106 D |
| 3,215,417 | 11/1965 | Whitmore et al. | 261/142 |
| 3,310,425 | 3/1967 | Goldsmith | 117/106 R |
| 3,423,324 | 1/1969 | Best et al. | 117/106 R |
| 3,438,803 | 4/1969 | Dubble et al. | 117/106 R |
| 3,496,010 | 2/1970 | Bracken et al. | 117/106 |

Primary Examiner—Tim R. Miles
Attorney—Norman N. Holland

[57] ABSTRACT

An apparatus for vapor coating glass articles where the coating is applied to heated glass articles being carried on a moving conveyor. The apparatus includes a vapor generating cabinet and a connected fuming or vapor coating tunnel which directs the vapor onto the surfaces of the moving glass articles. The vapor is reduced by the heat of the articles to a protective film such as a metallic oxide. The coating tunnel includes means for directing the vapor onto the moving articles and means at opposite ends of the tunnel for both exhausting excess vapor and for forming vapor confining and moisture excluding air curtains.

7 Claims, 7 Drawing Figures

INVENTORS
THOMAS H. HALL JR.
JOHN R. COTTRILL
BY ROGER D. DUBBLE

ATTORNEY

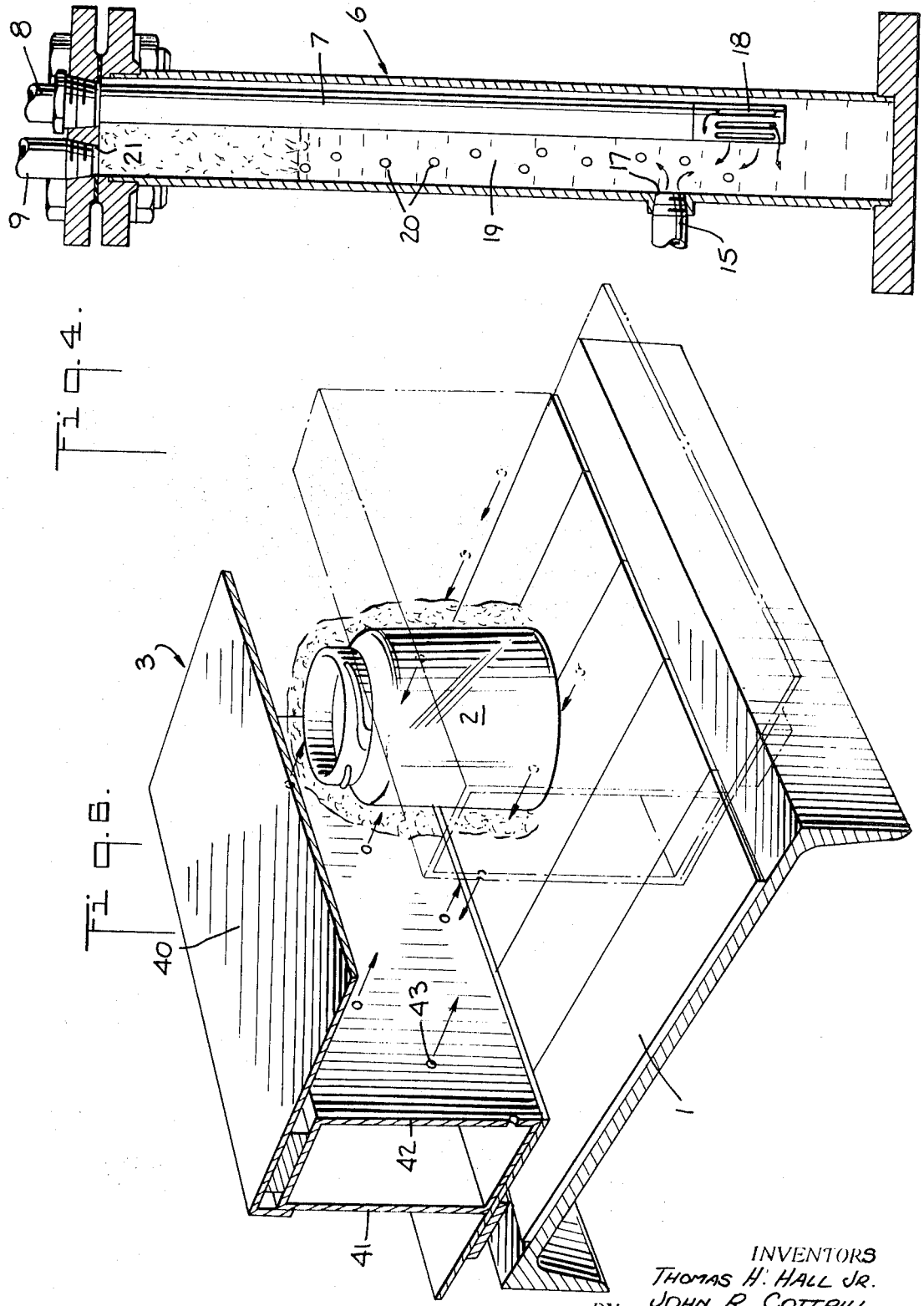

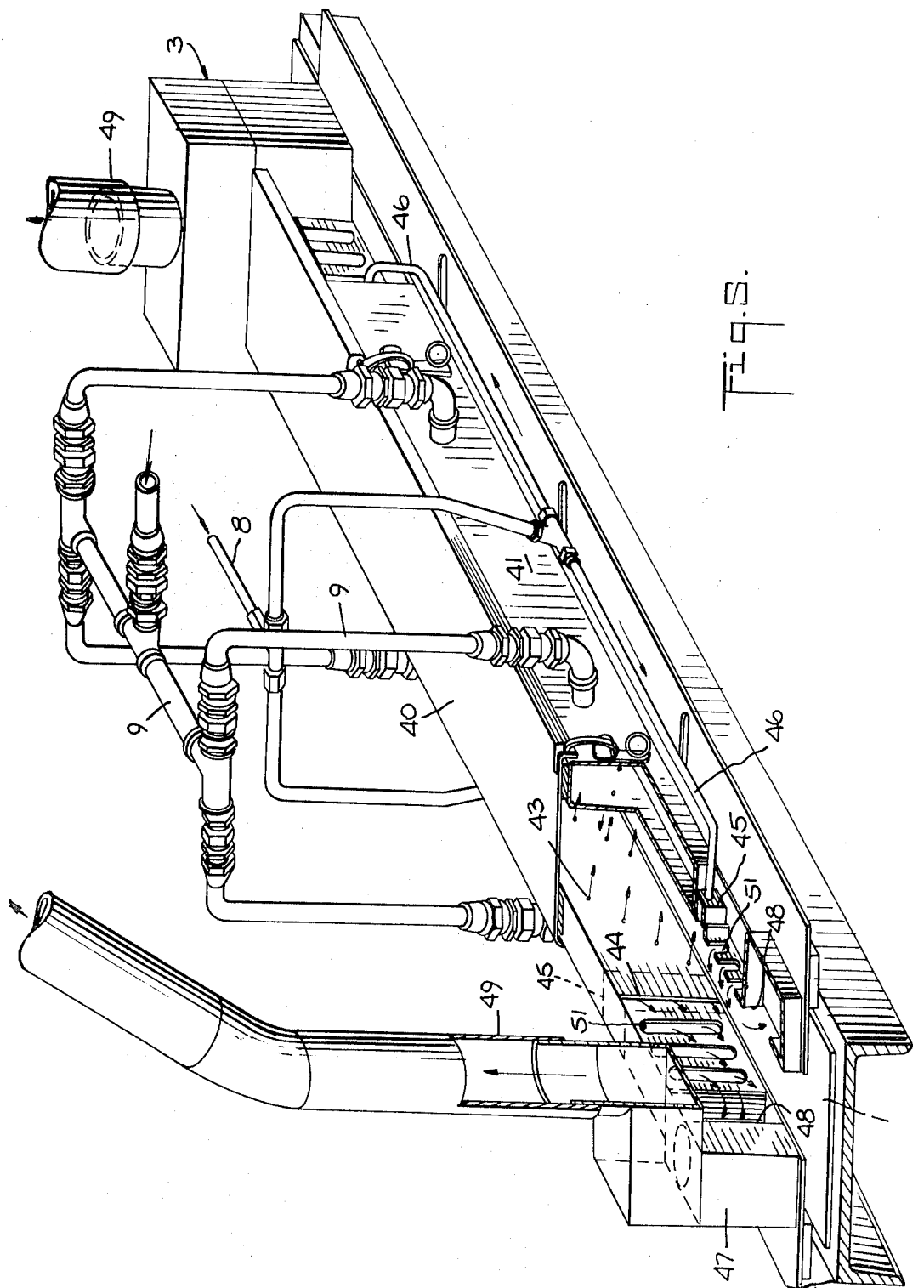

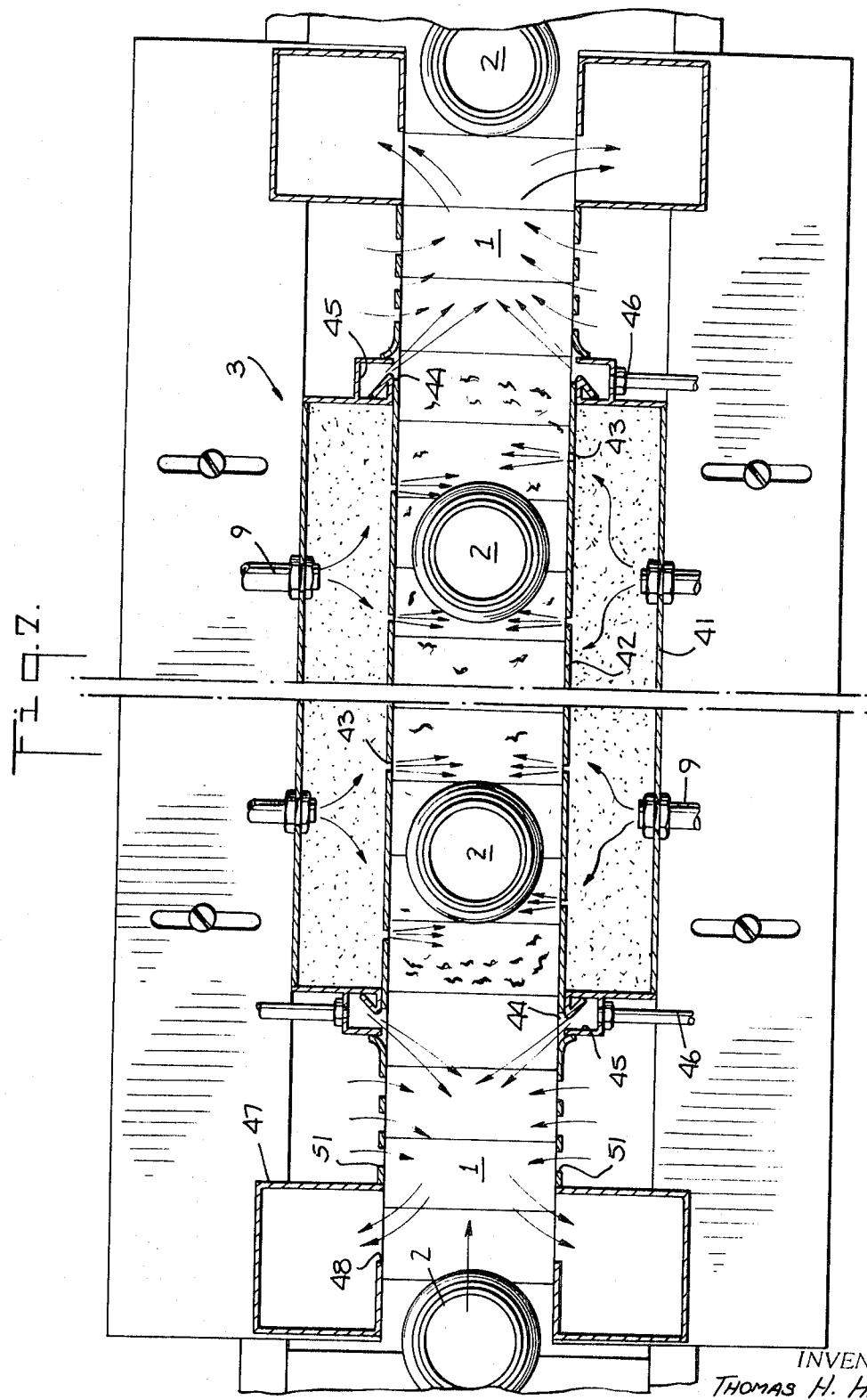

MEANS FOR VAPOR COATING

This invention relates to the art of applying thin protective coatings to glass articles, such as glass containers, including means for generating a coating vapor and for thereafter exposing heated containers to the vapor in the coating operation. This invention is an improvement upon the method and apparatus of United States patent application Ser. No. 456,623 filed May 18, 1965 and now U.S. Pat. No. 3,438,803 dated Apr. 15, 1969 and owned by the assignee of the present invention.

BACKGROUND OF THE INVENTION

Manufacturers of glass containers and similar articles have discovered that the handling of their products is facilitated and the breakage of their products is substantially reduced by the addition of thin substantially invisible metallic oxide protective coatings to the outer surfaces of the articles. Various formulations of coating substances have been selected for particular purposes. One of the more effective types of protective coatings is applied by pyrolyzing vapors of metallic compounds in hot surfaces of the glass articles. Various methods and apparatus have been used for generating and applying such vapors to the glass articles. In particular, apparatus has been developed for the application of coatings to glass articles as they are moved on conveyors directly from glass forming apparatus and while the articles still retain some heat from their formation.

The above noted patent discloses such a method and related apparatus and the present invention is an improvement of the method and of the combined vapor generating cabinet and vapor applying tunnel. In particular, the present invention provides more efficient and more easily controlled vapor generating apparatus and an improved vapor applying tunnel which combine to produce a more effective overall coating with better control of coating thickness and with more efficient use of the coating material.

SUMMARY OF THE INVENTION

The coating apparatus comprises two principle components. The first of these is a vapor generator for converting a liquid source of the coating vapor to its vapor state. The preferred embodiment of the vaporizer includes bubbling devices in which the liquid is subjected to a stream of dry air bubbles. The collected bubbles provide a substantially saturated vapor which is fed at a controlled rate and pressure to the second principle portion of the system which is the vaporizing or fuming tunnel. The improved generator has means for substantially eliminating vapor condensation by having the entire ambient atmosphere in the generator temperature controlled and by including condensate return means. The articles to be coated, such as glass containers, are preferably passed on a conveyor through the coating tunnel in a continuous stream. By moving newly molded glass articles directly from the molding or forming machines, the retained forming heat in the articles maintains their surfaces at the desired vapor pyrolyzing temperature.

The vapor tunnel surrounds the conveyor and includes an elongated vapor dispensing portion where the vapor is directed onto the surfaces of the moving glass. The open entry and exit ends of the tunnel include an arrangement of air passages and exhaust outlets whereby a curtain of dry air is provided in combination with the exhaust flow to permit passage of the glass articles while preventing a loss of vapor from the tunnel and preventing the entry of moisture into the tunnel.

Accordingly, an object of the invention is to provide an improved apparatus for coating glass articles.

Another object of the invention is to provide an improved means for vaporizing liquids for use with vapor coating apparatus.

Another object of the invention is to provide a continuously operating vapor generator for a vapor coating system.

Another object of the invention is to provide an improved vapor coating tunnel for directing vapors uniformly onto the surfaces of moving articles.

Another and further object of the invention is to provide an improved vapor coating tunnel for forming pyrolyzed vapor films of metallic oxides on heated moving glass articles.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings forming a part of the specification, wherein:

FIG. 4 is an enlarged sectional view of one of the bubbling devices of the apparatus of FIG. 3.

FIG. 5 is a perspective view partially cut away of the vaporizing tunnel.

FIG. 6 is an enlarged fragmentary perspective view illustrating the central or vapor applying portion of the tunnel of FIG. 5; and FIG. 7 is a top plan view partially cut away of the vaporizing tunnel of FIGS. 5 and 6.

DESCRIPTION OF THE PREFERRED EMBODIMENT

Figure 1:
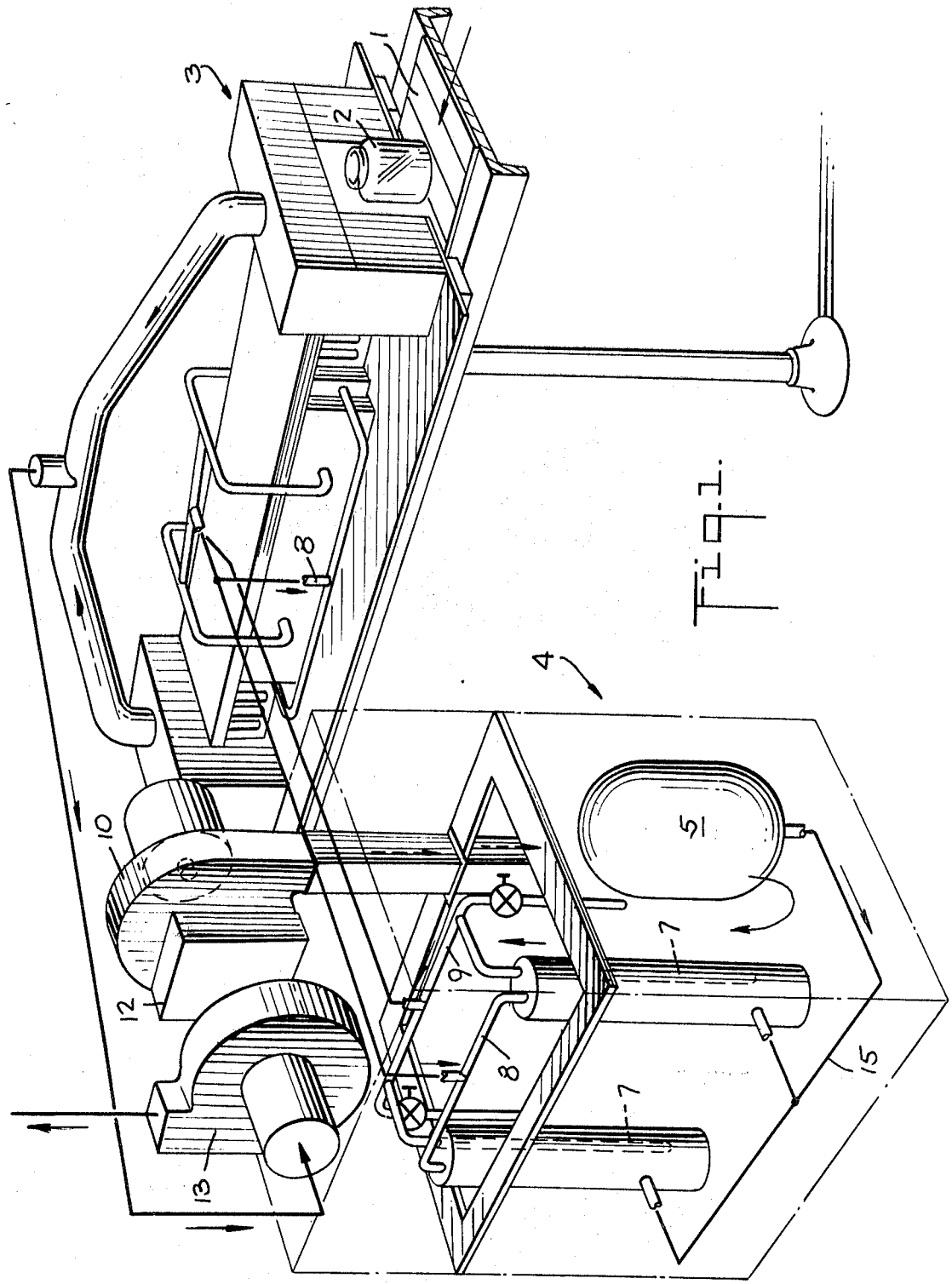
FIG. 1 is a perspective view of a preferred embodiment of the coating apparatus in accordance with the present invention, with the vapor generating means shown partially in diagrammatic form.

A preferred embodiment of the apparatus in accordance with the present invention will first be described generally with particular reference to FIG. 1. A conventional article conveyor 1 is illustrated at the right hand side of FIG. 1 carrying glass containers 2 in single file. The conveyor 1 moves the articles 2 through the coating tunnel 3 which forms a thin protective metal oxide coating on the article surfaces by subjecting the heated articles 2 to a vapor of a metallic compound so that the vapor is pyrolyzed or reduced on the hot article surface. A variety of compounds are used for this purpose, including compounds such as tetra-isopropyl titanate, tin tetrachloride, titanium tetrachloride, zirconium tetrachloride, germanium tetrachloride, vanadium tetrachloride or other vapor sources depending upon the particular coating desired. A vapor generating means or cabinet 4 is shown on the left hand side of the drawing which is forming a vapor from the above named or other compounds and which is feeding the vapor to the fuming or vaporizing tunnel 3 surrounding the conveyor 1.

THE VAPORIZING APPARATUS

A preferred embodiment of the vaporizing apparatus or cabinet 4 is shown partially in diagrammatic form in FIG. 1. The cabinet is seen to include a tank 5 containing the particular liquid compound to be vaporized. An outlet from the tank 5 feeds the liquid to one or the other of a pair of identical vaporizing chambers or bubbler devices 6. These vaporizing chambers 6 are partially filled with the liquid and have generally vertical bubbler tubes 7 extending downwardly into the liquid. These bubbler tubes 7 are coupled to a source of dry air under pressure through a suitable air inlet 8. Air passing downwardly through one or the other of the bubbler tubes 7 escapes from an outlet at the bottom of the tubes so that bubbles are formed which rise through the liquid and which become substantially vapor saturated. This causes a vapor atmosphere to form above the liquid and this vapor is fed by the vapor outlet tube 9 to the vaporizing tunnel 3 for application to the glass articles 2 as will be more fully described below.

A significant improvement results in the control of the vaporizing action by a temperature controlled heating of the interior of the vaporizing cabinet 4. A preferred means for this uniform heating comprises a hot air circulating means including an air blower 10 which directs air downwardly through an air heating duct 11 and a collecting means 12 at the top of the cabinet 4 which collects the rising air within the cabinet 4 to redirect it again through the blower 10.

An exhaust fan 13 is illustrated in a convenient position on the top of the vaporizing cabinet 4 to provide an exhaust system for the tunnel 3 exhaust outlet which will be described below in the detailed description of the tunnel 3.

Figure 2:
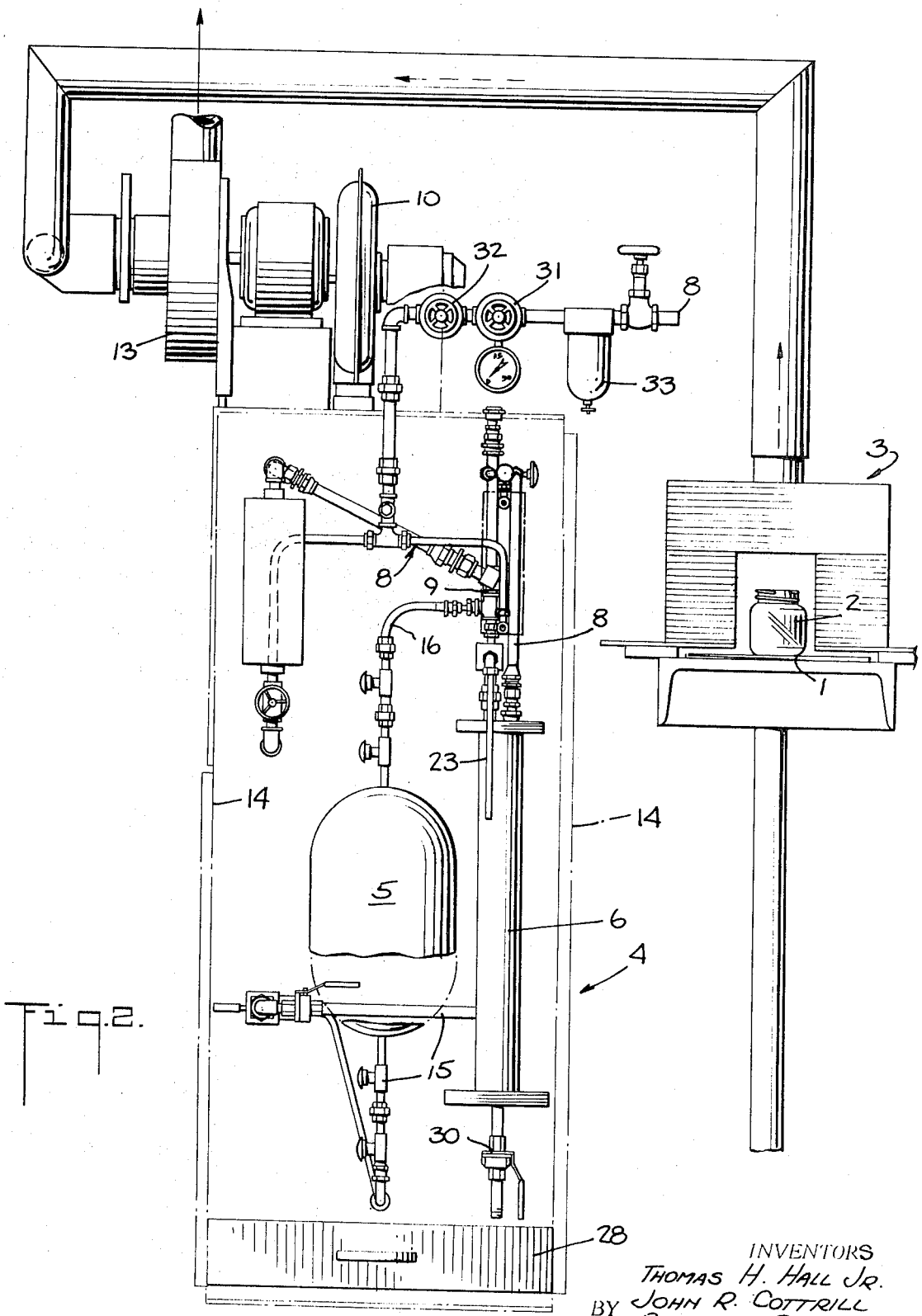
FIG. 2 is a front elevational view, partially cut away, illustrating a preferred embodiment of the coating apparatus.
Figure 3:
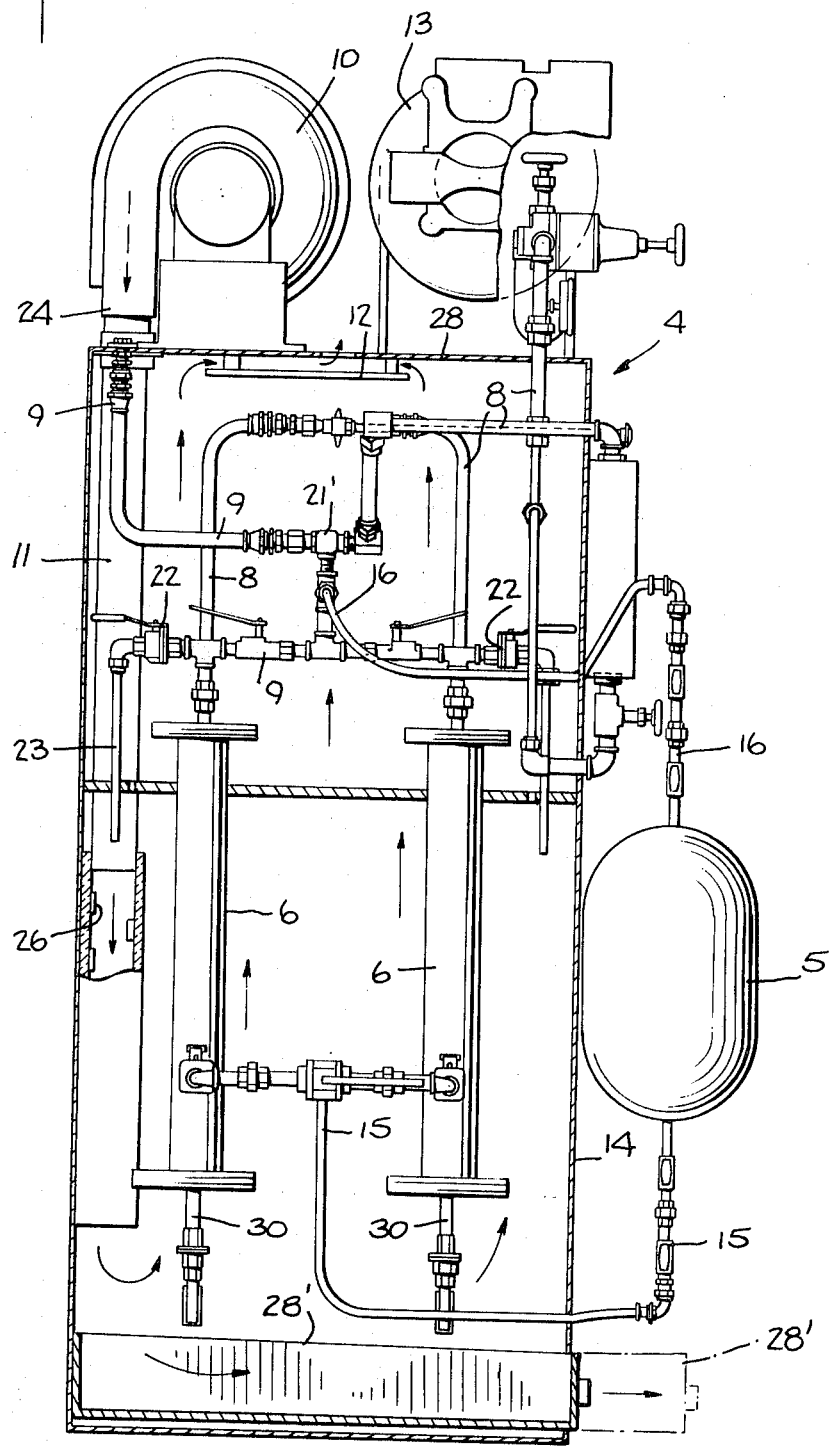
FIG. 3 is a side elevational view partially cut away of the apparatus of FIG. 2.

FIGS. 2 and 3 illustrate in greater detail a preferred embodiment of the vapor generator cabinet 4. The tank 5 for storing the preferred liquid vapor source is conveniently mounted on the cabinet sidewalls 14. An outlet conduit 15 couples the vapor source liquid alternately to one or the other of the two identical vaporizing chambers 6 mounted within the cabinet 4. A return conduit 16 is shown coupled at the top of the tank 5 which communicates with the vapor chamber outlet 9 to return any vapor condensate forming within the vapor outlet lines 9.

As indicated above, the preferred method and means for vaporizing the liquid comprises a bubbler tube 7 positioned within the vaporizing chamber 6 as illustrated in the detailed sectional view of FIG. 4. FIG. 4 illustrates the liquid inlet from line 15 at 17. The vertical bubbler tube 7 is seen to extend downwardly for positioning a series of air outlets 18 at a submerged position in the liquid 19. Dry air is forced from air inlet line 8 through the bubbler tube 7 and the outlets 18 causing a continuous stream of bubbles 20 to rise upwardly through the liquid 19. These bubbles 20, which become substantially vapor saturated, form a vapor atmosphere above the liquid 19 under pressure so that the vapor flows upwardly and outwardly through the vapor outlet 21 to vapor line 9 including a dilution nozzle or venturi mixer 21', illustrated in FIG. 3, and across to the vaporizing tunnel 3. Each of the vapor outlet lines 9 is seen to include a manually operated pressure relief valve 22 and a safety outlet 23 to vent undesirable pressure build-up in the system during servicing.

Improved control of the vaporizing operation including a more consistent and easier control of the vapor pressure and flow has been found to be obtained by bringing all elements of the vapor generating system within the cabinet 4 to a common controlled and slightly elevated temperature. A preferred means for this temperature control is a hot air circulating device which comprises the air blower 10 positioned at the top of the cabinet 4 with its outlet 24 directed downwardly through a vertical conduit 11. This conduit 11 includes an electrical thermostatically controlled strip heater package 26. Air passing downwardly and out of the heated conduit 11 rises upwardly through the interior portions of the cabinet 4 past the vaporizing chambers 6 and the related air and vapor piping. This heated air is drawn through a return opening 12 in the cabinet top 28 back into the blower 10. Continuous operation of the blower 10 and the strip heater package 26 results in the establishment of a uniform stable ambient temperature within the cabinet 4.

The dual vaporizing system is provided so that a single vaporizing cabinet and tunnel may be continuously operated to facilitate the use of the system in a continuous glass forming operation. The vaporizing chambers 6 may be alternatively operated so that one or the other may be cleaned or adjusted without shutting down the system. Means may be provided whereby the various valves shown may be physically operated from positions outside the cabinet.

A continuous operation of the system is also facilitated by the above described fluid return line 16 from the vapor outlet line 9 and also by the provision of air access means to maintain an equalizing pressure in the supply tank 5. A sliding cleaner drawer 28' is also provided in the bottom of the cabinet 4 to permit the removal during operation of any fluid or other material whose accumulation in the cabinet might interfere with the operation or tend to cause an undesirable atmosphere within or around the cabinet 4. The drawer 28' preferably has an open top and a liquid tight bottom to contain any of the liquid vapor source which might have been vented through the above described safety valves 22 or otherwise released within the cabinet 4. The drawer includes liquid absorption elements to facilitate the removal of spilled liquids. The vaporizing chambers 6 preferably include individual drains 30 to facilitate clearing and cleaning these chambers.

An improved control of the generated vapor is obtained by careful control of the pressure of the air in the bubbler air feed line 8. The use of a pair of serially arranged pressure regulators 31 and 32 in particular has been found to provide improved results as well as the use of an air filter 33 in advance of the regulators.

THE VAPORIZING OR FUMING TUNNEL

An improved vaporizing tunnel 3 is illustrated in detail in FIGS. 5 through 7. In its preferred form, the tunnel 3 is arranged to surround the upper surface of the article moving on conveyor 1. The tunnel 3 includes a closed cover 40 and spaced side walls 41. The central portion of the tunnel 3 includes hollow side wall sections 42 whose interiors are coupled at spaced points to the source of vapor by the vapor distributing lines 9. The hollow wall sections 42 are seen to extend for a substantial distance along the sides of the moving conveyor 1.

A preferred form of vapor outlet in the wall sections 42 comprises a series of small vapor outlets or apertures 43 which are arranged in a pattern extending both along and up the inner tunnel walls. The preferred arrangement of these apertures 43 is illustrated in FIGS. 5 and 6 where the apertures 43 are shown in a pattern comprising rows of apertures 43 slanting upwardly in one direction on one side of the tunnel 3 and upwardly in the opposite direction in the other side of the tunnel 3. The distance between the slanted rows is seen to generally approximate the horizontal diameters of the articles 2 being coated and each row is seen to contain a plurality of outlets 43 between the bottom and top of the tunnel wall sections 42 such as the four outlets 43 shown in FIG. 5. The horizontally and vertically extending hollow vapor containing wall sections 42 together with the plurality of outlets 43, as described, has been found to produce a uniform vapor coating on moving articles such as the generally cylindrical containers 2 moving through the tunnel 3.

An additional important improved feature of the tunnel 3 is the treatment of the open ends of the tunnel 3 to permit article passage while at the same time confining the coating vapors. The preferred means, which will now be described, provides this result while at the same time leaving the vapor flow pattern within the tunnel undisturbed.

A protective air curtain provided at the entrance and at the exit to the tunnel 3 includes a first air curtain formed by generally vertical slits 44 in four small vertical air manifold chambers 45 located on both sides of the opposite tunnel ends. The air blown out of these slits is preferably dry air to prevent the entrance of any moisture into the tunnel from the room temperature. A convenient source of this air is the same source of dry air as is used for the above described bubblers which is fed by feed pipes 46 which are coupled to the chambers 45.

Exhaust outlets 47 with relatively large vertical openings 48 are provided on both sides of the tunnel 3 ends. These openings 48 between the tunnel ends and the above described dry air outlet slits vertical exhaust pipes 49 which are coupled to an exhaust blower 13 (FIG. 2). Air is drawn into these exhaust outlets 47 at the tunnel ends and a portion of this air forms a secondary air curtain formed of room air drawn through a series of vertical slots 51 positioned air outlet slits 44. This inwardly flowing room air through slots 51 may contain some moisture since the interior of the tunnel is protected by the first curtain of dry air flowing from the slits 44. The combination of the moving air curtains formed by the above described arrangement, including the four outlet exhausts 47, effectively seals the vapor in the tunnel while permitting passage of the moving articles 2.

It will be seen that an improved apparatus and method have been provided for vapor coating articles which are particularly useful for vapor coating hot newly formed glass articles being moved on a conveyor belt. The method and apparatus provide for a more efficient and better controlled vapor generation and for a more economical and improved moisture-free application of the vapor to the article surfaces. The vapor generating cabinet includes improved temperature control to decrease unintentional condensation as well as a better means for removing condensate which may form within the system and within the vaporizing cabinet.

The related tunnel means for applying the vapor to moving glass articles includes a more efficient vapor applying chamber together with efficient air curtain means for confining the vapor within the tunnel while permitting the free passage of the coated articles through the tunnel.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. In a cabinet vaporizer for continuously converting a liquid container coating formulation to a dry air and gas vapor mixture for application to the surfaces of articles and including a bubbler tank with a liquid inlet and a vapor outlet for exposing a supply of the liquid formulation to vapor forming air bubbles rising through the formulation from a submerged air bubbler tube and including a mixer for combining the vapor with dry air in predetermined proportions, the improvement comprising an enclosed hollow outer cabinet completely surrounding said vaporizing chamber means and the adjacent portions of the formulation tank feeding conduits and the bubbler tube air conduit and the vapor outlet conduit and the mixer, means for maintaining the air atmosphere within said cabinet and surrounding said chamber means and said mixer and said conduits at a constant temperature comprising an air recirculating means including a thermostatically controlled tunnel heater.

2. A vaporizer as claimed in claim 1 in which the tunnel heater comprises electric heaters positioned on spaced portions of the inner wall of an air duct.

3. A vaporizer as claimed in claim 1 in which said cabinet includes a normally closed liquid removal means in its lower portion.

4. A vaporizer as claimed in claim 3 in which said removal means comprises a slidably mounted drawer having a closed bottom and an open top.

5. A vaporizer as claimed in claim 1 in which said bubbler tube comprises a unitary generally vertical hollow tube having a plurality of air outlets at its lower and normally submerged end.

6. A vaporizer as claimed in claim 1 in which further comprises the vapor outlet of said bubbler tank including a pressure relief valve.

7. A vaporizer as claimed in claim 6 in which the vaporizing chamber means vapor outlet includes means for draining condensed vapor from the vapor outlet.

* * * * *